(12) United States Patent
Salsi et al.

(10) Patent No.: US 9,258,065 B2
(45) Date of Patent: Feb. 9, 2016

(54) COHERENT TRANSPONDER WITH ENHANCED FREQUENCY LOCKING

(71) Applicant: Alcatel Lucent, Boulogne Billancourt (FR)

(72) Inventors: Massimiliano Salsi, Nozay (FR); Oriol Bertran-Pardo, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/373,793

(22) PCT Filed: Feb. 12, 2013

(86) PCT No.: PCT/EP2013/052752
§ 371 (c)(1),
(2) Date: Jul. 22, 2014

(87) PCT Pub. No.: WO2013/127622
PCT Pub. Date: Sep. 6, 2013

(65) Prior Publication Data
US 2015/0023674 A1 Jan. 22, 2015

(30) Foreign Application Priority Data
Feb. 28, 2012 (EP) .................................... 12305239

(51) Int. Cl.
*H04B 10/61* (2013.01)
*H04B 10/63* (2013.01)
*H04B 10/2575* (2013.01)

(52) U.S. Cl.
CPC .......... *H04B 10/616* (2013.01); *H04B 10/2575* (2013.01); *H04B 10/61* (2013.01); *H04B 10/63* (2013.01)

(58) Field of Classification Search
CPC ...... H04B 10/61; H04B 10/63; H04B 10/616; H04B 10/6164; H04B 10/2575
USPC .................................... 398/25, 203, 208, 209
See application file for complete search history.

(56) References Cited

U.S. PATENT DOCUMENTS

| | | | | |
|---|---|---|---|---|
| 6,661,974 B1 * | 12/2003 | Ooi et al. | ........... | H04B 10/2513 398/158 |
| 2007/0036554 A1 * | 2/2007 | Weaver | .............. | H04B 10/0779 398/156 |

(Continued)

FOREIGN PATENT DOCUMENTS

| | | |
|---|---|---|
| WO | 2004054138 | 6/2004 |
| WO | 2010136068 | 12/2010 |

OTHER PUBLICATIONS

Diniz, J.C.M. et al; Simple Feed-Forward Wide-Range Frequency Offset Estimator for Optical Coherent Receivers; Jul. 27, 2011; XP055032938; Retrieved from the Internet: URL:http://www.opticsinfobase.org/DirectPDFAccess/CA186C97-B648-41B7-322CEA29CF0B59A2__224541.pdf?da=1&id=224541&seq=0 &mobile=no; [retrieved on Jul. 17, 2012.

(Continued)

*Primary Examiner* — Dalzid Singh
(74) *Attorney, Agent, or Firm* — Patti & Malvone Law Group, LLC (57) ABSTRACT

The present document relates to an optical communication system. In particular, the present document relates to the alignment of the laser frequency at a transmitter of the optical communication system and the local oscillator frequency at a coherent receiver of the optical communication system. A coherent optical receiver (222) is described. The receiver (222) comprises a reception unit adapted to convert a received optical signal at a carrier frequency into a digital signal using a local oscillator, referred to as LO, having an LO frequency; a spectral analysis unit adapted to estimate a degree of asymmetry of a spectrum of the received optical signal, based on the digital signal; and a transmission unit adapted to transmit an indication of the degree of asymmetry to a near-end transponder (210) comprising a transmitter (211) of the received optical signal.

15 Claims, 4 Drawing Sheets

(56) References Cited

U.S. PATENT DOCUMENTS

| | | | |
|---|---|---|---|
| 2009/0080906 A1* | 3/2009 | Tao | H04B 10/61 398/209 |
| 2009/0238579 A1 | 9/2009 | Rahn | |
| 2010/0098411 A1* | 4/2010 | Nakashima | H04B 10/60 398/25 |
| 2010/0183294 A1 | 7/2010 | Villarruel et al. | |
| 2012/0155890 A1* | 6/2012 | Zhou | H04B 10/6165 398/208 |
| 2012/0195602 A1* | 8/2012 | Nakashima | H04L 7/027 398/204 |
| 2014/0112424 A1* | 4/2014 | Spinnler | H03L 7/07 375/354 |

OTHER PUBLICATIONS

Lavery, D. et al; A Long-Reach Ultra-Dense 10 Gbit/s WDM-PON Using a Digital Coherent Receiver; Optics Express; Nov. 24, 2010; XP055034716; Retrieved from the Internet: URL:http://www.opticsinfobase.org/ DirectPDFAccess/CF6F1E31-9143-AC35-C7174DA607 FFC4D0__208398.pdf?da=1&id=208398&seq=0 &mobile=no; [retrieved on Aug. 6, 2012].

\* cited by examiner

COHERENT TRANSPONDER WITH ENHANCED FREQUENCY LOCKING

TECHNICAL FIELD

The present document relates to an optical communication system. In particular, the present document relates to the alignment of the laser frequency at a transmitter of the optical communication system and the local oscillator frequency at a coherent receiver of the optical communication system.

BACKGROUND

In current wavelength division multiplexing (WDM) optical communication systems, the tolerance of a nominal central frequency (e.g. +−1.5 GHz) of the laser at a transmitter of the WDM communication system is typically tolerable, because the ratio between the spacing (or bandwidth) of the optical communication channels (i.e. of the WDM channels) and the baud-rate per channel is relatively large. A typical channel spacing of DWDM (Dense WDM) systems is 50 GHz and typical baud-rates (e.g. using QPSK symbols) are at 28 Gbaud. Hence, typical spacing/baud-rate ratios are in the range of 1.8 or greater. Moreover, the frequency offset between the laser source at the transmitter and the local oscillator at a coherent receiver may typically be corrected by digital signal processing at the receiver. The digital signal processing for offset compensation can typically tolerate a pre-determined maximum frequency offset. For example, with QPSK symbols at 28 Gbaud (or Giga symbols/second) the maximum tolerable frequency offset with a channel spacing of 50 GHz is typically +/−3.5 GHz. In view of the above mentioned tolerances of laser sources in current coherent systems, frequency offsets between the laser source at the transmitter and the local oscillator at the coherent receiver may be compensated using digital signal processing.

On the other hand, in ultra-dense WDM systems, the channel spacing of the WDM channels is expected to be close to the symbol-rate (with a spacing/baud-rate ratio <1.2). Such ultra-dense WDM systems are expected to make use of narrow-band optical filters within the WDM channels (e.g. at the transmitter) in order to minimize or reduce the cross-talk between adjacent WDM channels. The narrow-band optical fibers are expected to provide a ratio bandwidth/baud-rate <1.2. In such ultra-dense WDM systems, the frequency stability of the laser source at the transmitter and in particular the alignment of the frequency of the laser source with respect to the central frequency of the narrow-band optical filters are expected to be a technical challenge.

Figure 1:
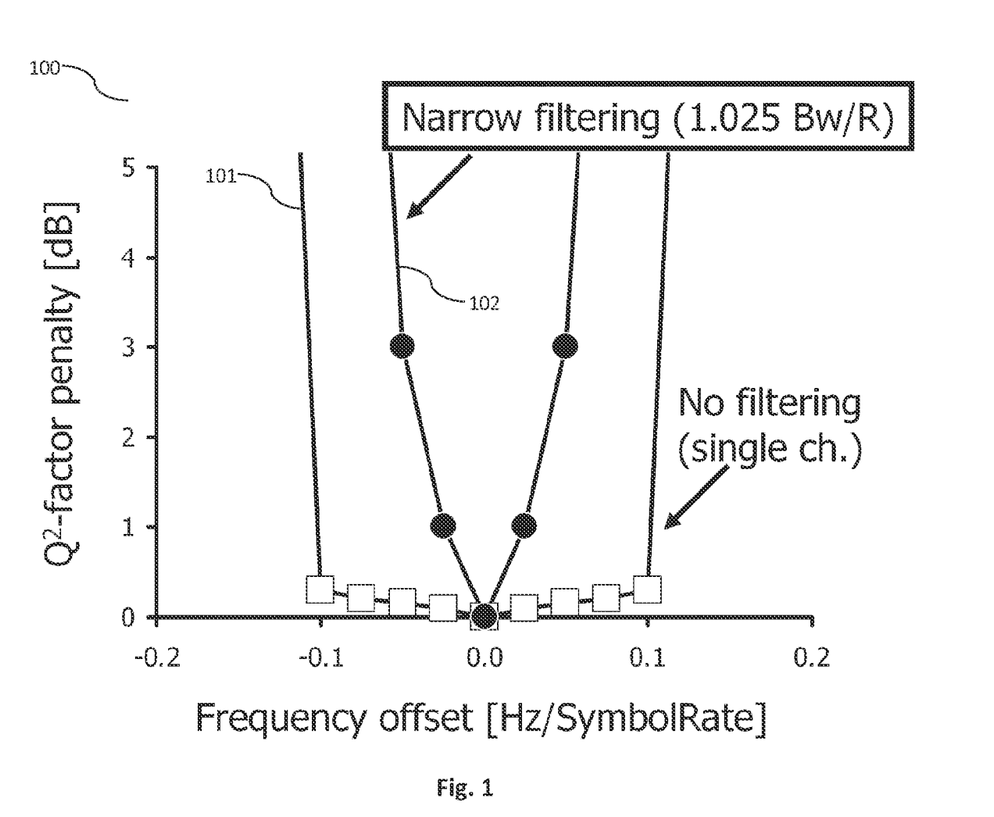
FIG. 1 illustrates an example error incurred by a frequency offset between the laser source at the transmitter and the local oscillator at the receiver.

As indicated above, the laser sources employed in optical communication systems typically have a tolerance of + or −1.5 GHz. These tolerances are too high with respect to the requirements of future optical systems (having a baud-rate in the range of >32.5 GBaud, and a channel spacing in the range of approx. 33.3 GHz). This is illustrated in the $Q^2$-factor penalty vs. frequency offset diagram 100 of FIG. 1. It can be seen that in case of no or a wide-band optical filtering at the transmitter (reference numeral 101), the communication system supports relatively high offsets between the frequency at the transmitter and the local oscillator (LO) frequency at the receiver. On the other hand, in case of narrow-band optical with the WDM channel (as is the case in ultra-dense WDM systems), even small deviations of the frequencies at the transmitter and the receiver lead to significant bit error rates (reference numeral 102). Hence, when operating with a signal bandwidth close to the baud-rate, a relatively small mismatch between the central frequency of the transmitted signal and the central frequency of the optical filter translates into a significant penalty.

The present document addresses the above mentioned technical issues. In particular, the present document describes a method and a system for aligning the frequencies of the laser source (at the transmitter) and the local oscillator (at the receiver), in order to allow for the implementation of ultra-dense WDM systems which a reduced channel spacing/baud-rate ratio compared to present optical WDM communication systems.

SUMMARY

According to an aspect a coherent optical receiver is described. Typically, the coherent optical receiver is part of an optical communication system, notably a wavelength division multiplex (WDM) communication system. Such WDM systems comprise a plurality of WDM channels having a pre-determined channel spacing (or bandwidth). The plurality of WDM channels may be used to link a transmitter with a corresponding coherent optical receiver. Typically, the transmitter and the receiver are comprised within respective transponders.

The optical receiver comprises a reception unit adapted to convert a received optical signal at a carrier frequency into a digital signal using a local oscillator (LO) having an LO frequency. The received optical signal typically comprises a sequence of symbols at a pre-determined symbol rate. The optical receiver may be configured to determine the sequence of symbols from the received optical signal. The optical receiver further comprises a spectral analysis unit adapted to estimate a degree of asymmetry of a spectrum of the received optical signal, based on the digital signal. For this purpose, the spectral analysis unit may make use of information available at the optical receiver, i.e. information which is derived from the digital signal. In addition, the optical receiver comprises a transmission unit adapted to transmit an indication of the degree of asymmetry to a near-end transponder comprising the transmitter of the received optical signal.

The optical receiver may comprise a frequency offset unit adapted to estimate and compensate an offset between the carrier frequency and the LO frequency. In this context, it should be noted that the reception unit typically comprises an optical-to-digital converter having a converter bandwidth and a center frequency. The frequency offset unit may be adapted to prevent truncations of the spectrum of the received optical signal caused by the converter bandwidth, by compensating the offset between the carrier frequency and the LO frequency. In other words, by ensuring that the LO frequency and the carrier frequency are not offset (or by maintaining the offset below a pre-determined offset level), the optical receiver may ensure that the received optical signal is not distorted by the bandwidth limitation of the optical-to-digital converter. The optical-to-digital converter typically comprises a coherent optical-to-analog converter followed by a bandwidth limited analog-to-digital converter (ADC).

The coherent optical receiver may comprise a transform unit adapted to transform the digital signal into the frequency domain, thereby yielding a plurality of spectral coefficients. Such a transform unit (performing e.g. a Fast Fourier Transform or a Discrete Fourier Transform) may be used by the optical receiver in conjunction with the compensation of chromatic dispersion (CD). The spectral analysis unit may be adapted to estimate the degree of asymmetry of the spectrum of the received optical signal based on the plurality of spectral coefficients. In particular, the spectral analysis unit may be adapted to determine a positive spectral energy based on spectral coefficients from the plurality of spectral coefficients associated with signal frequencies greater than zero. Furthermore, the spectral analysis unit may be adapted to determine a negative spectral energy based on spectral coefficients from the plurality of spectral coefficients associated with signal frequencies smaller than zero. The degree of asymmetry of the spectrum of the received optical signal may be estimated based on the positive spectral energy and based on the negative spectral energy (e.g. based on a difference or a ratio of the positive and negative spectral energies).

The received optical signal may be polarization multiplexed comprising a first and a second signal component in a first and a second polarization plane, wherein the first and the second polarization planes are orthogonal with respect to one another. The first and the second signal component may each comprise a sequence of symbols at the symbol rate. In such cases, the coherent optical receiver typically comprises a polarization demultiplexing unit adapted to determine a plurality of polarization demultiplexing filters based on the digital signal. The spectral analysis unit may then be adapted to estimate the degree of asymmetry of the spectrum of the received optical signal based on the plurality of polarization demultiplexing filters.

As indicated above, the received optical signal has typically been transmitted over a first WDM channel having a plurality of adjacent WDM channels. As such, the received optical signal may have been distorted by cross-talk originating from one or more of the adjacent WDM channels. The plurality of polarization demultiplexing filters is typically adapted to capture such distortions caused by cross-talk. In particular, the plurality of polarization demultiplexing filters may comprise a differential mode component adapted to isolate the first and the second signal components. In other words, the differential mode component may be adapted to perform the polarization demultiplexing. Furthermore, the plurality of polarization demultiplexing filters may comprise a common mode component adapted to reduce the cross-talk from the one or more WDM channels adjacent to the first WDM channel. Hence, the spectral analysis unit may be adapted to estimate the degree of asymmetry of the spectrum of the received optical signal based on the common mode component of the plurality of polarization demultiplexing filters.

The plurality of polarization demultiplexing filters is typically a corresponding plurality of finite impulse response (FIR) filters, wherein each filter typically comprises N filter taps, with N>1. Typically, the polarization demultiplexing unit makes use of four FIR filters arranged in a butterfly structure. The common mode component of the plurality of polarization demultiplexing filters may be a FIR filter comprising N average filter taps. The N average filter taps may correspond to the respective average values of the N filter taps of the plurality of polarization demultiplexing filters (e.g. the respective average of the N filter taps of the four FIR filters). Hence, the common mode component is a filter (typically a low pass filter) having a common mode frequency response. The spectral analysis unit may be adapted to estimate the degree of asymmetry of the spectrum of the received optical signal based on a degree of asymmetry of the common mode frequency response.

The optical receiver (comprised within a far-end transponder) may be coupled to a near-end transponder (which comprises the transmitter) via second WDM channel. In other words, the optical receiver may provide feedback to the transmitter via a second WDM channel. While the first WDM channel may allow for a communication from the transmitter (i.e. from the near-end transponder) to the optical receiver (i.e. to the far-end transponder), the second WDM channel may allow for a communication from the far-end transponder to the near-end transponder. Typically, the data is transmitted on the second WDM channel in Optical Transport Unit (OTU) frames, each comprising a respective frame overhead. The structure of the OTU frames may be in accordance to the Optical Transport Network (OTN) standard. The transmission unit of the optical receiver may be adapted to insert the indication of the degree of asymmetry into the frame overhead of an Optical Transport Unit frame transmitted on the second WDM channel.

According to a further aspect, an optical communication system (e.g. a WDM system) is described. The system may comprise a transmitter (e.g. within a near-end transponder) adapted to transmit an optical signal at a carrier frequency. Furthermore, the system may comprise a coherent receiver (e.g. within a far-end transponder) according to any of the aspects outlined in the present document. The receiver may be adapted to receive the optical signal and to estimate a degree of asymmetry of a spectrum of the received optical signal. Furthermore, the receiver may be adapted to transmit an indication of the degree of asymmetry to the near-end transponder (which comprises the transmitter). The transmitter (or the near-end transponder) may be adapted to adjust the carrier frequency based on the indication of the degree of asymmetry.

As indicated above, the coherent receiver may be adapted to convert the received optical signal into a digital signal using a local oscillator (LO) having an LO frequency. Furthermore, the optical receiver may be adapted to adjust the LO frequency in accordance to the adjustment of the carrier frequency performed by the transmitter. This may be done by explicitly adjusting the LO frequency by the same amount of adjustment applied to the carrier frequency. For this purpose, the transmitter and the receiver may use identical rules for determining the amount of adjustment of the carrier frequency based on the indication of the degree of asymmetry. Alternatively or in addition, the receiver may make use of its frequency offset unit (also referred to as the carrier frequency estimation and compensation unit), in order to adjust the LO frequency (in accordance to the adjustment to the carrier frequency).

The optical communication system may further comprise a first WDM channel adapted to transmit the optical signal from the transmitter to the coherent receiver. The first WDM channel typically comprises an optical filter having a bandwidth which is adapted to a bandwidth of the first WDM channel. The optical filter may be used to reduce cross-talk between adjacent WDM channels. Furthermore, the system may comprise a second WDM channel adapted to transmit the indication of the degree of asymmetry from the far-end transponder comprising the coherent receiver to the near-end transponder.

According to another aspect, a method for aligning a carrier frequency of an optical signal transmitted over a first WDM channel with a frequency response of an optical filter comprised within the WDM channel is described. The method may comprise receiving the optical signal and converting the received optical signal at the carrier frequency into a digital signal using a local oscillator having an LO frequency. The method may proceed in estimating a degree of asymmetry of a spectrum of the received optical signal, based on the digital signal. An indication of the degree of asymmetry may be transmitted to a transmitter of the received optical signal.

The method may further comprise estimating an offset between the carrier frequency and the LO frequency and compensating the offset between the carrier frequency and the LO frequency. The offset estimation and compensation may be performed at an optical receiver. Furthermore, the method may comprise performing a spectral analysis of a signal derived from the digital signal, thereby yielding a power spectrum, and estimating the degree of asymmetry based on the power spectrum. These steps may be performed by the optical receiver. In addition, the method may comprise adjusting the carrier frequency based on the indication of the degree of asymmetry, which is typically performed by the transmitter. In a similar manner, the LO frequency may be adjusted by the receiver in accordance to the adjustment of the carrier frequency.

As indicated above, the optical signal typically comprises a sequence of symbols at a pre-determined symbol rate. The digital signal processing at the optical receiver (e.g. CD compensation, polarization de-multiplexing, carrier frequency estimation and compensation, symbol identification) is typically performed at the symbol rate, thereby recovering the sequence of symbols from the received optical signal. On the other hand, the estimating and the transmitting steps (i.e. the method steps related to the determination of an indication of the degree of asymmetry of the spectrum of the received optical signal) may be repeated at a feedback rate. The feedback rate may be lower than the symbol rate. By way of example, the feedback rate may be 1/10 or less, 1/100 or less, 1/1000 or less than the symbol rate. A feedback rate which is reduced compared to the symbol rate takes into account the fact that the effects of misalignment of the carrier frequency and the frequency response of the optical filter are typically slower than the symbol rate.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF THE DRAWINGS

The invention is explained below in an exemplary manner with reference to the accompanying drawings, wherein.

DETAILED DESCRIPTION

As outlined above, the present document is directed at the implementation of an ultra-dense WDM communication system. In particular, the present document addresses the technical problem of ensuring that the laser source at the transmitter is aligned with the (narrow-band) optical filters comprised within the ultra-dense WDM communication system. One approach to the above technical problem could be to reduce the tolerance of the laser frequency provided by the laser source within the transmitter of the WDM system. It is to be expected, however, that the tolerance of the laser frequency of the laser sources will not drop below ±1 GHz in the coming years. By way of example, such tolerances may be due to the operating temperature of the laser source, due to tolerances within the production process and/or due to the aging of the laser source. Consequently, it is not to be expected that the fluctuations of the laser sources can be reduced sufficiently in order to implement ultra-dense WDM communication systems.

The present document takes a system approach to overcoming the above mentioned technical problem. In particular, the present document suggests moving from a "blind" transponder (transmitter/receiver) to a transponder which is aware of its own environment. It is proposed to extend the smartness of the coherent receiver to the whole WDM communication system, in particular to the transmitting transponder. The perception of the environment of the transponder enables the transponder to properly adjust the frequency of the optical transmission signal (at the transmitter) and the frequency of the local oscillator (at the receiver) as a function of the analysis done by a digital signal processor comprised within the coherent receiver. In other words, information which is available at the coherent receiver may be commonly shared between the near-end transponder (i.e. the transmitter) and the far-end transponder (i.e. the coherent receiver), thereby enabling an alignment of the frequency of the laser source and of the frequency of the local oscillator. The exchange of this information also enables the alignment of the frequencies with the frequency response of an optical filter comprised within the WDM channel.

Hence, the above mentioned optical communication system may make use of one or more of the following building blocks. In particular, the optical communication system may employ a communication link and method between the near-end and the far-end transponder. This communication link may be used to provide feedback information from the far-end transponder (i.e. from the coherent receiver) to the near-end transponder (i.e. to the transmitter). Furthermore, the optical communication system may make use of an analysis regarding the performance of the WDM channels. This analysis may be performed by the digital signal processor (DSP) at the coherent receiver. The analysis regarding the WDM channels may be directed at the estimation of the nearest cross-talk source of a present WDM channel. In addition, the optical communication system may make use of an algorithm (executed based on the information available at the optical receiver), in order to determine the necessity and the amount of frequency adjustments of the transmitter laser source and of the local oscillator laser source.

Figure 2:
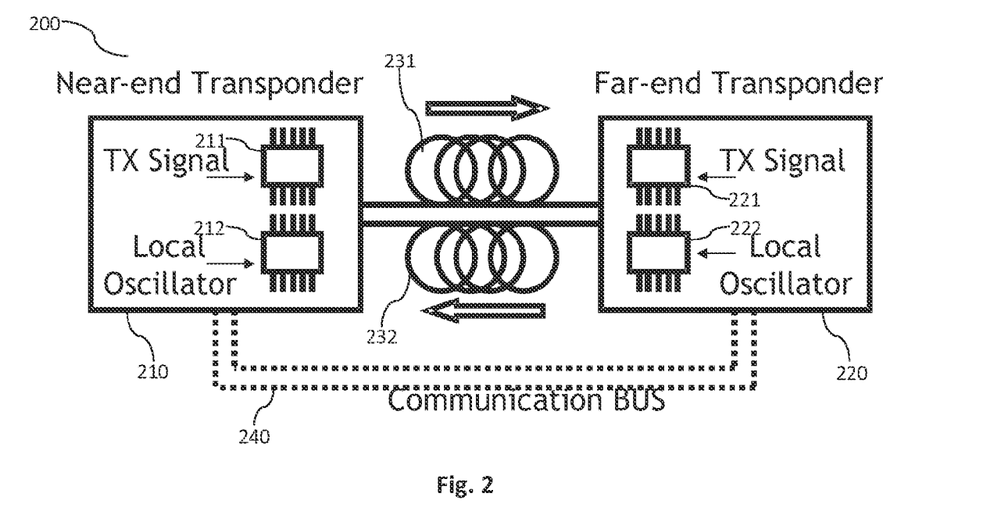
FIG. 2 shows an example optical communication system.

FIG. 2 shows an example optical communication system 200. The optical communication system 200 comprises a near-end transponder 210 and a far-end transponder 220. Both transponders 210, 220 comprise a transmitter 211, 221 and a (coherent) receiver 212, 222 (comprising respective local oscillators). The transmitter 211 of the near-end transponder 210 sends optical signals via one or more optical WDM transmission channels 231 to the receiver 222 of the far-end transponder 220. In the other direction, the transmitter 221 of the far-end transponder 220 sends optical signals via one or more optical WDM transmission channels 232 to the receiver 212 of the near-end transponder 210. Furthermore, the near-end transponder 210 and the far-end transponder 220 are linked via a (bi-directional) communication link 240.

Figure 3:
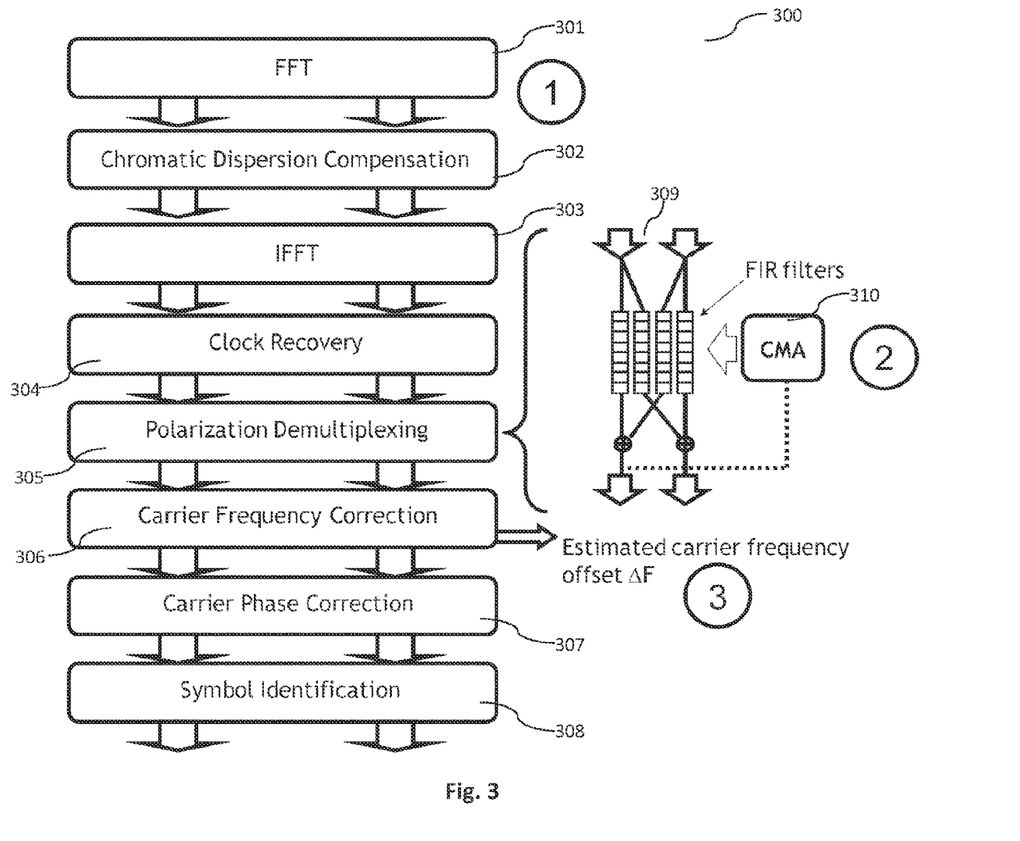
FIG. 3 shows example components of the digital signal processing performed at a coherent optical receiver.

The coherent receivers 212, 222 typically comprise a digital signal processor configured to compensate for distortions incurred by an optical signal during the transmission via a particular WDM transmission channel 231, 232. FIG. 3 shows example components of a digital signal processor 300 comprised within the coherent receivers 212, 222. The digital signal processor (DSP) 300 comprises a transform unit 301 which transforms the received signal (derived from the received optical signal via optical-to-analog and analog-to-digital conversion) from the time-domain into the frequency domain (e.g. using a Fast Fourier Transform, or a Discrete Fourier Transform). The subsequent chromatic dispersion (CD) compensation unit 302 of the DSP 300 typically operates on the frequency domain representation of the received signal, thereby yielding a CD compensated signal in the frequency domain. The CD compensated signal is transformed into the time-domain using an inverse transform unit 303 (performing e.g. an inverse Fast Fourier Transform, or an inverse Discrete Fourier Transform). Furthermore, the DSP 300 comprises a clock recovery unit 304 for recovering a clocking signal used within the optical communication system 200.

The optical signal transmitted via the communication channel 231, 232 is typically polarization multiplexed. This means that the optical signal comprises two orthogonally polarized signal components (each at a particular baud rate, e.g. at 28 Gbaud or at 32.5 Gbaud). The polarization demultiplexing unit 305 is configured to isolate the two orthogonally polarized signal components from the received signal. For this purpose, the polarization demultiplexing unit 305 may comprise a demultiplexing filter 309 comprising four FIR (Finite Impulse Response) filters arranged in a butterfly arrangement. The FIR filters 309 have a pre-determined number N of filter taps (also referred to as filter coefficients) which may be determined using a CMA (Constant Modulus Algorithm) 310. The FIR filters 309 may typically be divided into two filter components, a so called common mode component and a so called differential mode component. The differential mode component is primarily responsible for turning the polarization plane of the received signal, in order to correctly identify the polarization planes of the two orthogonally polarized signal components. The common mode component is primarily responsible for removing undesirable cross-talk distortions within the received signal, which may be due to interferences of the particular WDM channel with neighboring WDM channels. The common mode components is typically a low pass type of filter directed at isolating the signal portions of the particular WDM channel from signal portions originating from neighboring WDM channels. The common mode component of the four FIR filters 309 of the polarization demultiplexing unit 305 may be determined as the average filter derived from the four FIR filters 309, e.g. by determining the average N filter taps from the four sets of N filter taps.

Furthermore, the DSP 300 comprises a carrier frequency estimation and compensation unit 306 which is adapted to determine an offset between the carrier frequency of the received signal and the frequency of the local oscillator of the coherent receiver 220. As outlined above, the carrier frequency estimation and compensation unit 306 is typically limited to the estimation and compensation of a pre-determined maximum frequency offset, caused e.g. by distortion effects on the transmission channel 231 or caused due to fluctuations of the frequencies of the transmitter laser source and the LO. The frequency estimation and compensation unit 306 is typically not configured to determine and compensate a frequency offset which is due to a significant misalignment between the frequency of the laser source at the transmitter and the frequency of the local oscillator at the receiver. This is particularly the case in ultra-dense WDM communication systems, which make use of a narrow-band optical filter at the transmitter to avoid or to reduce cross-talk between adjacent WDM channels. The frequency estimation and compensation unit 306 provides an estimation of the frequency offset $\Delta F$.

Additional components of the DSP 300 are typically a carrier phase estimation and compensation unit 307 configured to estimate and compensate distortions incurred on the phase of the received signal. Finally, the compensated received signal is submitted to symbol identification in the detection unit 308, thereby recovering the data transmitted over the optical communication system 200.

As such, a coherent receiver can perform signal analysis and counteract laser frequency mismatches. Coherent receivers provide access to all the characteristics of the optical field (amplitude, phase and modulation) of the received signal, using the algorithms of the DSP 300 shown in FIG. 3. These characteristics of the received optical field may be used for the frequency alignment scheme described in the present document. In particular, there are at least three sources of information for making the transponder 210, 220 aware of its environment, and in particular aware of a frequency mismatch between the near-end transponder 210 and the far-end transponder 220. These sources of information are indicated by the encircled numbers 1, 2 and 3 in FIG. 3.

A first source of information (number 1) comes from the frequency transform unit 301 which is performed prior to applying the chromatic-dispersion compensation filter. The transform unit 301 provides spectral information of the received signal which may be used to determine a frequency mismatch between the near-end transponder 210 and the far-end transponder 220 (and the frequency response of an optical filter comprised in the WDM channel). A second source of information (number 2) comes from the analysis of the FIR filters 309 of the polarization demultiplexing unit 305. As indicated above, the FIR filters 309 are (continuously) updated by the CMA algorithm 310. In particular, the common mode component of the FIR filters 309 may provide information on the spectrum of the received signal (and on the influence of neighboring WDM channels on the spectrum of the received signal). A third source of information (number 3) comes from the estimated carrier frequency offset $\Delta F$ provided by the frequency estimation and compensation unit 306.

As such, it may be taken into account that coherent transponders 210, 220 typically apply the chromatic-dispersion filter (of CD compensation unit 302) in the frequency domain and therefore inherently provide the received signal in the frequency domain. Moreover, the transponders 210, 220 may apply a chromatic-dispersion estimation technique based on the analysis of the frequency spectrum of the received signal, thereby providing additional spectral information on the received signal. Furthermore, it may be considered that the coefficients of the FIR filters 309 used within the polarization demultiplexing unit 305 are typically set by an adaptive algorithm, e.g. the CMA (Constant Modulus Algorithm) 310. The goal of the CMA 310 and the resulting FIR filters 309 is to optimize the quality of the received signal. By way of example, the FIR filters 309 may be configured to filter out potential sources of cross-talk outside of the signal bandwidth, as well as noise. Consequently, the frequency response of the FIR filters 309 provides an indication of undesirable spectral portions (e.g. cross-talk or noise) comprised within the received signal. Furthermore, it may be taken into account that typical commercial lasers have the possibility to select a particular WDM channel (e.g. an ITU-T G.694.1 channel) as well as the possibility to fine tune the emitted frequency around the central frequency of the particular WDM channel. This functionality of channel selection and fine tuning is typically slow (in the range of 10 seconds) compared to the processing speed of the DSP 300 which is typically configured to estimate a frequency offset $\Delta F$ in less than 1 µs. Hence, the frequency estimation and compensation unit 306 is typically configured to almost instantly track the frequency offset $\Delta F$ between the frequency of the laser within the transmitter and the local oscillator at the receiver. As such, it may be assumed that in a converged state of the optical transmission system 200, the frequency estimation and compensation unit 306 has converged also, thereby providing zero offset between the transmitter laser frequency and the frequency of the LO (if the frequency offset is smaller than the maximum detectable frequency offset).

As indicated above, the present document is directed at a method and a system for ensuring an alignment of the frequency of the laser at the transmitter and the frequency of the local oscillator at the receiver in case of ultra-dense WDM channels. As indicated above, the typical misalignments of frequencies may not be fully compensated by the frequency estimation and compensation unit 306 in such a case. The presently described method and system are derived from the observation of the spectrum of the transmitted signal (after modulation) being symmetric. Thereby, if the transmitter laser source and the LO frequency are aligned with the optical filters (having a response which is also symmetric) then the signal spectrum at the receiver should also be symmetric.

Figure 4:
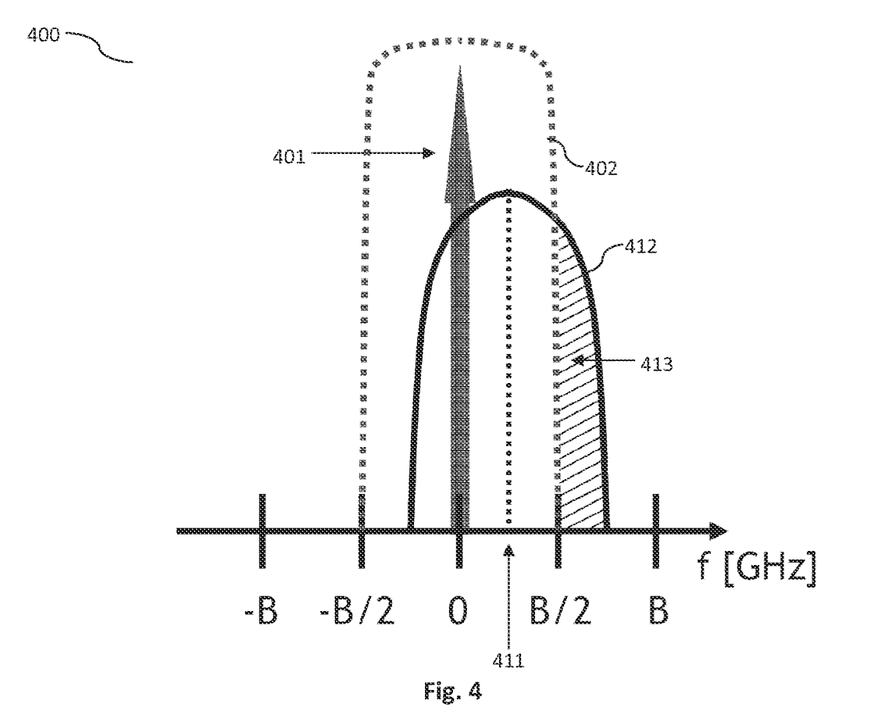
FIG. 4 illustrates schematically the effects incurred by a frequency offset between the laser source at the transmitter and the local oscillator at the receiver.

An observed asymmetry of the spectrum of the received signal may be due to different reasons:
1. As outlined above, there may be an offset in the carrier frequency of the received signal the frequency of the LO. This offset may be detected, measured and corrected in the DSP 300 using the frequency offset correction unit 305. The effect of such an offset is illustrated in the frequency diagram 400 of FIG. 4. FIG. 4 shows the bandwidth 402 of the coherent receiver, wherein the bandwidth of the coherent receiver is mainly influenced by the bandwidth limitations of the analog-to-digital converters (ADC) used within the coherent receiver. Furthermore, FIG. 4 shows the frequency 401 of the local oscillator of the coherent receiver, which defines the zero frequency (i.e. the center frequency of the coherent receiver). In addition, FIG. 4 shows the center frequency 411 of the received signal and the spectrum 412 of the received signal. A portion 413 of the spectrum 412 may be lost due to the frequency offset and due to the bandwidth 402 of the coherent receiver. If the lost portion 413 of the spectrum 412 exceeds a pre-determined fraction, then the carrier frequency estimation and compensation unit 306 may not be able to determine the correct frequency offset $\Delta F$ anymore. In such cases, the method and system described in the present document may be used to align the carrier frequency and the LO frequency.
2. There may be a misalignment between the frequency of the transmitter 210 and the frequency response of the optical filter within the WDM channel 231. As indicated above, the optional filter within an ultra-dense WDM channel 231 may be very narrow, in order to prevent or reduce cross-talk between adjacent channels. In particular, the bandwidth of the optical filter may be smaller than the bandwidth 402 of the coherent receiver. A misalignment of the frequency of the transmitter 210 and the frequency response of the optical filter within the WDM channel 231 typically leads to a transmitted signal (and by consequence to a received signal) which has a spectrum which is truncated at one side. The side of truncation may indicate the direction of misalignment and the extent of truncation may indicate the extent of misalignment. It is proposed in the present document to determine the direction and/or the extent of truncation of the transmitted signal due to misalignment, based on the sources of information (numbers 1, 2 and 3 of FIG. 3) available at the coherent receiver.

As such, an algorithm for improving the quality of the received signal with respect to the filtering functions comprised within the optical transmission system 200 (i.e. within the transmitter 210, the WDM channel 231, the receiver 220) may be described. The algorithm is directed at eliminating the performance dependency of the optical transmission system 200 on the frequency stability of the lasers comprised within the optical transmission system 200 (notably within the transmitter 210).

Figure 5:
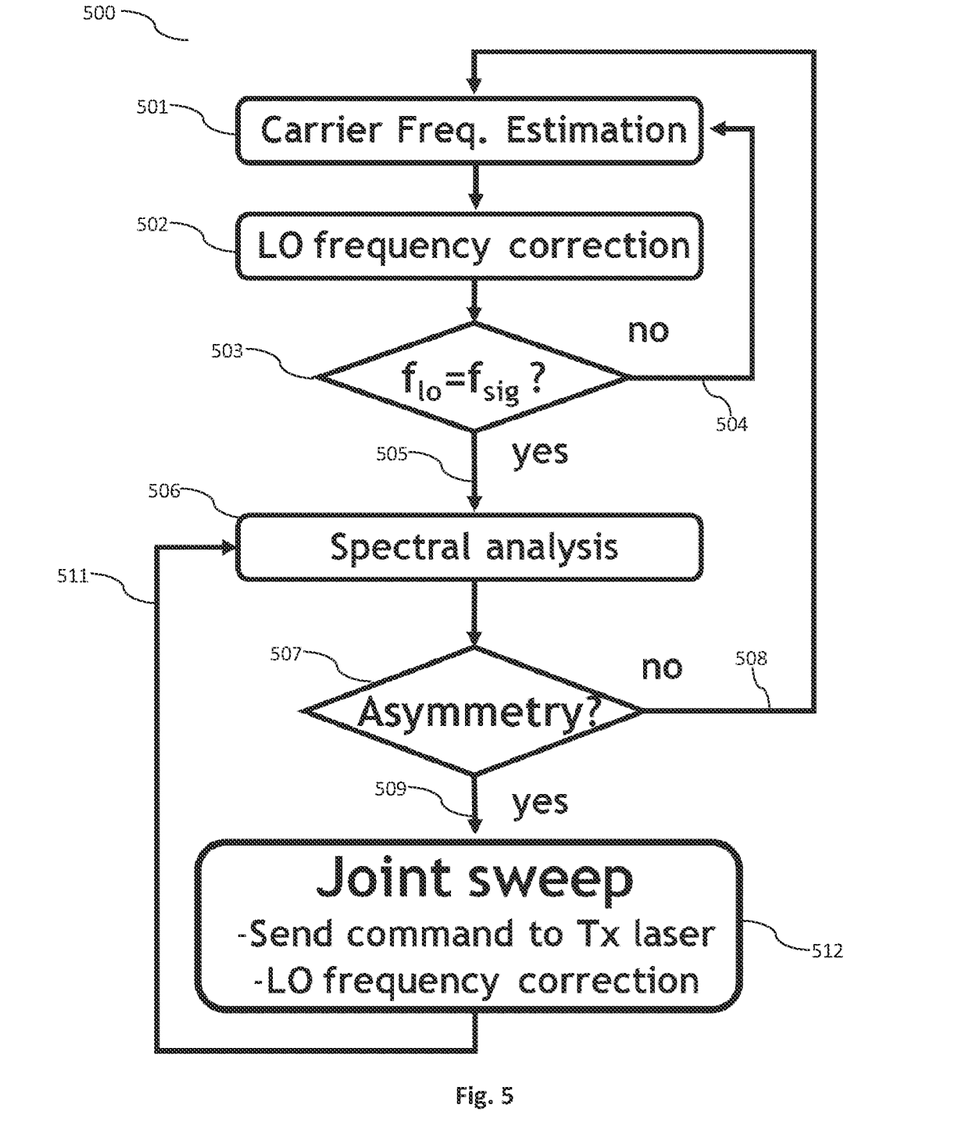
FIG. 5 shows the flow chart of an example method for aligning the frequencies of the laser source at the transmitter and the local oscillator at the receiver with the frequency response of an optical filter of the WDM channel.

FIG. 5 illustrates a flow chart of an example algorithm or method 500 for aligning the frequency of the transmitter laser source and the frequency of the local oscillator with each other and with the frequency response of an optical filter comprised in the WDM channel 231. The algorithm 500 may perform one or more of the following steps:
1. carrier frequency estimation (step 501), in order to determine the difference between the frequencies of the remote transmitter laser and the local oscillator, and thereby compensating for a frequency offset $\Delta F$. The carrier frequency estimation typically makes use of the source of information number 3 of FIG. 3.
2. adjustment (step 502) of the local oscillator frequency at the receiver such that the difference between the frequencies of the remote transmitter laser and the local oscillator are zero. The steps 501 and 502 are repeated until the offset between the carrier frequency and the frequency of the LO is compensated (steps 503, 504)
3. spectral analysis (steps 505, 506) of the received signal, in order to detect a possible asymmetry within the spectrum of the received signal. Due to the fact that the frequency offset between the transmitter laser and the local oscillator has already been compensated, such asymmetry should be due to a misalignment between the transmitter laser frequency and the optical filter of the WDM channel. The spectral analysis may make use of the sources of information number 1 and 2 shown in FIG. 3.
4. If an asymmetry is detected within the spectrum of the received signal (step 507, 509), the frequency of the local oscillator at the receiver and the frequency of the remote transmitter laser may be adjusted jointly to reduce (e.g. minimize) the asymmetry (step 512). Such joint adjustment of the frequencies may be achieved by first moving the frequency of the remote transmitter laser, and by then tracking the frequency offset of the LO to cancel the frequency offset (using the frequency offset and compensation unit 306).

In order to provide the asymmetry/misalignment information from the coherent receiver to the transmitter, the optical communication system 200 makes use of the communication link 240 between the far-end and near-end transponders 220, 210. As such, the far-end transponder 220 may inform the near-end transponder 210 of the asymmetry and of the need to adjust the laser frequency, in order to align the laser frequency to the frequency response of the optical filter of the WDM channel 231.

The above mentioned method 500 may reevaluate the alignment situation in a periodic manner (e.g. iteratively) (steps 508, 511), thereby providing an automatic alignment of the transmitter laser frequency to the frequency response of the optical filter of the WDM channel 231. The automatic alignment of the local oscillator and the laser source is able to compensate for laser source fluctuations during the life of the laser source, since the above mentioned laser frequency locking algorithm maintains the lasers sufficiently aligned for tolerating the narrow channel filtering and channel spacing of ultra-dense WDM systems.

The method 500 has been described in conjunction with carrier frequency estimation (step 501) and carrier frequency compensation (step 502) in the digital domain by the carrier frequency estimation and compensation unit 306. It should be noted that the carrier frequency estimation and compensation unit 306 may not be configured to estimate and correct the impact of a physical offset on a band limited receiver which filters away an important part of the signal. In other words, if the frequency offset leads to a significant truncated spectral portion 413, the carrier frequency estimation and compensation unit 306 may not be able to reduce the frequency offset to zero. This leads to an asymmetry of the spectrum of the received signal which may be used to request the transmitter to adjust the frequency of the transmitter laser source (step 509, 512). Subsequently, the carrier frequency estimation and compensation unit 306 determines the frequency offset based on the adjusted transmitter laser frequency (wherein the frequency offset should now lie within the detectable range).

In the following, various schemes for detecting a misalignment of the laser frequency at the transmitter and the optical filter of the WDM channel are described. The spectrum of the received signal is provided by the transform unit 301. As already indicated above, the compensation of a frequency offset between the carrier frequency of the received signal and the frequency of the local oscillator is performed almost instantaneously (i.e. within a few µs) compared to the relatively slow process of alignment of the frequency of the transmitter laser with respect to the frequency response of the optical filter of the WDM channel (a few seconds). Consequently, it can be assumed that in a converged situation of the above mentioned method 500, the carrier frequency of the received signal is (almost) aligned to the frequency of the local oscillator. By consequence, the spectrum of the received signal should by symmetrical (because the spectrum 412 of the received signal is centered within the bandwidth 402 of the optical receiver (i.e. there should not be a spectral truncation 413 due to a frequency offset $\Delta F$).

Any asymmetry of the spectrum of the received signal should therefore be due to a spectral truncation performed by the optical filter of the WDM channel. Such a spectral truncation occurs if the transmitter laser frequency and the frequency response of the optical filter are misaligned. Hence, the degree of symmetry or the degree of asymmetry of the spectrum of the received signal can be taken as an indication of the degree of misalignment of the transmitter laser frequency with the frequency response of the optical filter of the WDM channel. By way of example, the degree of asymmetry may be determined based on the energy $E^+$ of the positive spectrum and the energy $E^-$ of the negative spectrum. The energy of the spectrum may be determined based on the mean square average of the frequency coefficients of the spectrum of the received signal. As such, the difference $\Delta E = E^+ - E^-$, or the normalized difference $\Delta E = 2*(E^+ - E^-)(E^+ + E^-)$ or the ratio $R = E^+ E^-$ may be taken as an indicator for the degree of asymmetry. The degree of asymmetry provides an indication with regards to the direction of the misalignment (negative or positive difference, ratio greater one or smaller than one), as well as with regards to the extent of the misalignment (absolute difference, deviation of the ratio from one). The information regarding the direction and/or the extent of misalignment may be provided by the coherent receiver (far-end transponder 220) to the transmitter (near-end transponder 210).

Alternatively or in addition, an indication of the degree of misalignment may be derived from the FIR filters 309 comprised within the polarization demultiplexing unit 305. If all the laser sources of the optical transmission system 200 are aligned with their respective optical filters and knowing that the signal spectrum is symmetric, then the analysis of the transfer function of the FIR filters 309 of the polarization demultiplexer unit 305 should return a symmetric function. In particular, the common mode component of the FIR filters 309 may be determined, e.g. by averaging the four FIR filters 309, thereby yielding an average FIR filter. In the absence of cross-talk generated by neighboring WDM channels, the average FIR filter should have a symmetric frequency response. Such symmetry could e.g. be measured by determining the frequencies of 3 dB and/or 6 dB attenuation of the average FIR filter on the positive frequency axis and on the negative frequency axis, thereby yielding $f_1^{30}$ (frequency of 3 dB attenuation on the positive axis), $f_1^-$ (frequency of 3 dB attenuation on the negative axis), $f_2^+$ (frequency of 6 dB attenuation on the positive axis) and $f_2^-$ (frequency of 6 dB attenuation on the positive axis). In case of symmetry. The sum of the frequencies should be zero.

On the other hand, if the sum of the frequencies, deviates from zero, then this indicates an asymmetry of the frequency response of the FIR filters. An asymmetry of the response of the FIR filters could be used as an alternative or as an additional source of information, in order to adjust frequency misalignments. In particular, this source of information is typically sensitive to the cross-talk generated by neighbor channels. In particular, a negative sum of the frequencies $f_1^+$, $f_1^-$, $f_2^+$ and $f_2^-$ may indicate cross-talk originating from a WDM channel at higher frequencies than the particular WDM channel (thereby indicating a misalignment towards higher frequencies), whereas a positive sum of the frequencies $f_1^+$, $f_1^-$, $f_2^+$ and $f_2^-$ may indicate cross-talk originating from a WDM channel at lower frequencies than the particular WDM channel (thereby indicating a misalignment towards lower frequencies). The absolute value of the sum of the frequencies $f_1^+$, $f_1^-$, $f_2^+$ and $f_2^-$ may indicate a degree of the misalignment.

In the following, a possible implementation of the communication link 240 between the near-end transponder 210 and the far-end transponder 220 is described. For this purpose, the near-end transponder 210 and the far-end transponder 220 may make use of the communication protocols used for exchanging data (payload information) on the WDM channels 231, 232 of the optical communication system 200. In particular, the near-end transponder 210 and the far-end transponder 220 may make use of the Optical Transport Network (OTN) protocol framework specified in ITU-T standard G.709. The OTN framework defines how to route payload data across an optical communication system 200. The payload data is embedded into so called frames, wherein each frame comprises a frame overhead. The frame overhead comprises a plurality of fields (bytes), wherein the plurality of fields may be used to implement specific communication and control channels between the network elements (e.g. the transponders 210, 220) of the optical communication system 200. The overhead of the OTN frames (typically referred to as Optical Transport Unit (OTUk) frames) are directly accessible by the near-end transponder 210 and the far-end transponder 220.

Consequently, the far-end transponder 220 may insert the information regarding the misalignment of a particular laser of a particular WDM channel 231 of the near-end transponder 220 into a pre-determined byte of the overhead of an OTUk frame which is sent via the optical communication channel 232 from the far-end transponder 220 to the near-end transponder 210, thereby informing the near-end transponder 210 that the frequency of the particular laser (of the particular WDM channel 231 in the opposite direction) should be aligned. As such, the communication link 240 can be implemented as an in-band communication link 240 on the plurality of WDM channels 231, 232.

In the present document, a method and system for aligning the frequency of a transmitter laser and the frequency of a local oscillator of a corresponding coherent receiver with one another, as well as with an optical filter comprised within the transmission channel are described. The described method and system enable the use of commercial lasers sources (having relatively high fluctuations of the laser frequency) for WDM communication systems having reduced channel spacing and/or WDM communication systems having are reduced channel spacing/baud-rate ratio. The described method and system make the performance of optical WDM communication systems independent of frequency fluctuations of the lasers used within the WDM communication system.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A coherent optical receiver, comprising:
    a reception unit adapted to convert a received optical signal from a transmitter at a carrier frequency into a digital signal using a local oscillator, referred to as LO, having an LO frequency;
    a spectral analysis unit adapted to estimate a degree of asymmetry of a spectrum of the received optical signal, based on the digital signal; and
    a transmission unit adapted to transmit an indication of the degree of asymmetry to a near-end transponder comprising said transmitter of the received optical signal.

2. The optical receiver of claim 1, further comprising:
    a frequency offset unit adapted to estimate and compensate an offset between the carrier frequency and the LO frequency.

3. The optical receiver of claim 2, wherein the reception unit comprises an optical-to-digital converter having a converter bandwidth and a center frequency; and
    the frequency offset unit is adapted to prevent truncations of the spectrum of the received optical signal caused by the converter bandwidth, by compensating the offset between the carrier frequency and the LO frequency.

4. The optical receiver of claim 1, wherein
    the coherent optical receiver comprises a transform unit adapted to transform the digital signal into the frequency domain, thereby yielding a plurality of spectral coefficients; and
    the spectral analysis unit is adapted to estimate the degree of asymmetry of the spectrum of the received optical signal based on the plurality of spectral coefficients.

5. The optical receiver of claim 4, wherein the spectral analysis unit is adapted to:
    determine a positive spectral energy based on spectral coefficients from the plurality of spectral coefficient associated with signal frequencies greater than zero;

determine a negative spectral energy based on spectral coefficients from the plurality of spectral coefficient associated with signal frequencies smaller than zero; and estimate the degree of asymmetry of the spectrum of the received optical signal based on the positive spectral energy and the negative spectral energy.

6. The optical receiver of claim 1, wherein
the received optical signal is polarization multiplexed comprising a first and a second signal component in a first and a second polarization plane;
the first and the second polarization planes are orthogonal with respect to one another;
the coherent optical receiver comprises a polarization demultiplexing unit adapted to determine a plurality of polarization demultiplexing filters based on the digital signal; and
the spectral analysis unit is adapted to estimate the degree of asymmetry of the spectrum of the received optical signal based on the plurality of polarization demultiplexing filters.

7. The optical receiver of claim 6, wherein
the received optical signal has been transmitted over a first wavelength division multiplex, referred to as WDM, channel;
the plurality of polarization demultiplexing filters comprises a differential mode component adapted to isolate the first and the second signal components;
the plurality of polarization demultiplexing filters comprises a common mode component adapted to reduce cross-talk from one or more WDM channels adjacent to the first WDM channel;
the spectral analysis unit is adapted to estimate the degree of asymmetry of the spectrum of the received optical signal based on the common mode component of the plurality of polarization demultiplexing filters.

8. The optical receiver of claim 7, wherein
the plurality of polarization demultiplexing filters are finite impulse response, referred to as FIR, filters, each comprising N filter taps, with N>1;
the common mode component is a FIR filter comprising N average filter taps;
the N average filter taps correspond to the respective average values of the N filter taps of the plurality of polarization demultiplexing filters;
the common mode component has a common mode frequency response; and
the spectral analysis unit is adapted to estimate the degree of asymmetry of the spectrum of the received optical signal based on a degree of asymmetry of the common mode frequency response.

9. The optical receiver of claim 1, wherein
the optical receiver is coupled to the near-end transponder comprising the transmitter via a second WDM channel;
data is transmitted on the second WDM channel in Optical Transport Unit frames comprising a frame overhead; and
the transmission unit is adapted to insert the indication into the frame overhead of an Optical Transport Unit frame transmitted on the second WDM channel.

10. An optical communication system, comprising:
a transmitter adapted to transmit an optical signal at a carrier frequency;
a coherent receiver according to claim 1, adapted to receive the optical signal;
estimate a degree of asymmetry of a spectrum of the received optical signal; and
transmit an indication of the degree of asymmetry to a near-end transponder comprising the transmitter;
wherein the transmitter is adapted to adjust the carrier frequency based on the indication of the degree of asymmetry.

11. The optical communication system of claim 10, wherein the coherent receiver is adapted to:
convert the received optical signal into a digital signal using a local oscillator, referred to as LO, having an LO frequency; and
adjust the LO frequency in accordance to the adjustment of the carrier frequency performed by the transmitter.

12. The optical communication system of claim 10, further comprising:
a first wavelength division multiplex, referred to as WDM, channel adapted to transmit the optical signal from the transmitter to the coherent receiver;
wherein the first WDM channel comprises an optical filter having a bandwidth which is adapted to a bandwidth of the first WDM channel; and/or
a second WDM channel adapted to transmit the indication from a far-end transponder comprising the coherent receiver to the near-end transponder.

13. A method for aligning a carrier frequency of an optical signal transmitted over a first wavelength division multiplex, referred to as WDM, channel with a frequency response of an optical filter comprised within the WDM channel, the method comprising:
receiving the optical signal from a transmitter;
converting the received optical signal at the carrier frequency into a digital signal using a local oscillator, referred to as LO, having an LO frequency;
estimating a degree of asymmetry of a spectrum of the received optical signal, based on the digital signal; and
transmitting an indication of the degree of asymmetry to a near-end transponder comprising said transmitter of the received optical signal.

14. The method of claim 13, further comprising any one or more of:
estimating an offset between the carrier frequency and the LO frequency;
compensating the offset between the carrier frequency and the LO frequency;
performing a spectral analysis of a signal derived from the digital signal, thereby yielding a power spectrum;
estimating the degree of asymmetry based on the power spectrum;
adjusting the carrier frequency based on the indication; and
adjusting the LO frequency in accordance to the adjustment of the carrier frequency.

15. The method of claim 13, wherein
the optical signal comprises a sequence of symbols at a pre-determined symbol rate;
the receiving, and the converting steps are repeated at the symbol rate;
the estimating and the transmitting steps are repeated at a feedback rate; and
the feedback rate is equal to or lower than the symbol rate.

* * * * *